United States Patent
Gall et al.

[11] Patent Number: 6,149,834
[45] Date of Patent: Nov. 21, 2000

[54] CORROSION INHIBITED CHLORIDE SALT DE-ICERS

[75] Inventors: James A. Gall, Midland; Steven F. Mertz, Ludington, both of Mich.

[73] Assignee: The Dow Chemical Company, Midland, Mich.

[21] Appl. No.: 09/417,004

[22] Filed: Oct. 12, 1999

Related U.S. Application Data

[60] Provisional application No. 60/105,864, Oct. 27, 1998.
[51] Int. Cl.⁷ ...................................................... C09K 3/18
[52] U.S. Cl. ............................ 252/70; 106/13; 106/15.05
[58] Field of Search ................................ 252/70; 106/13, 106/15.05

[56] References Cited

U.S. PATENT DOCUMENTS

| | | | |
|---|---|---|---|
| 2,410,910 | 11/1946 | Wait | 117/100 |
| 3,412,030 | 11/1968 | Wahlberg et al. | 252/70 |
| 3,712,802 | 1/1973 | Grybek et al. | 71/79 |
| 4,676,918 | 6/1987 | Toth et al. | 252/70 |
| 4,824,588 | 4/1989 | Lin | 252/70 |
| 5,302,307 | 4/1994 | Ireland | 252/70 |
| 5,435,941 | 7/1995 | Von Fraunhofer | 252/392 |
| 5,531,931 | 7/1996 | Koefod | 252/387 |
| 5,635,101 | 6/1997 | Janke et al. | 252/70 |
| 5,772,912 | 6/1998 | Lockyer et al. | 252/70 |
| 5,876,621 | 3/1999 | Sapienza | 252/70 |
| 5,919,394 | 7/1999 | Janke et al. | 252/70 |
| 5,922,240 | 7/1999 | Johnson et al. | 252/70 |
| 5,932,135 | 8/1999 | Janke et al. | 252/70 |
| 5,965,058 | 10/1999 | Janke et al. | 252/70 |
| 5,980,774 | 11/1999 | Sapienza | 252/70 |

FOREIGN PATENT DOCUMENTS

87/03293  6/1987  WIPO ............................. C09K 3/18

OTHER PUBLICATIONS

Chemical Abstract No. 123:59562, abstract of Hungarian Patent Specification No. 65997 (Aug. 1994).

*Primary Examiner*—Anthony Green

[57] ABSTRACT

A novel chloride salt based de-icing composition comprising a corrosion inhibitor of a de-sugared sugar beet molasses. The corrosion inhibited de-icing compound comprises from 5 to 25 percent by weight of de-sugared molasses compared with the weight percent of the chloride salt in the de-icing composition.

6 Claims, No Drawings

CORROSION INHIBITED CHLORIDE SALT DE-ICERS

REFERENCE TO RELATED INVENTIONS

This application claims the benefit of U.S. Provisional Application No. 60/105,864, filed Oct. 27, 1998 as "Corrosion Inhibited Chloride Salt De-Icers" by James A. Gall, Steven F. Mertz and Ryan M. Lipps.

BACKGROUND OF THE INVENTION

The present invention relates to a corrosion inhibitor for protecting metallic surfaces contacted with chloride-based de-icers.

Solid chloride salts such as sodium chloride and calcium chloride have been highly effective when used for removal of ice from highways. Unfortunately, chloride salts promote corrosion of metal. Consequently, the use of chloride salts enhances the corrosion of metals used as part of highways, such as bridges, signs and exposed reinforcing materials, as well as motor vehicles that use the highways.

Some chloride salts in solid form, particularly sodium chloride, suffer from a proclivity to bounce on pavement. Customary distributors for roadway distribution of solid salt, combined with the bouncing property of solid chloride salts can result in significant loss of ice melting capability from the scatter of solid salt off of the pavement surface. Chloride salts in liquid form offer advantages over solid chloride salts: a reduced chloride salt loading can be used per unit distance of pavement because losses off the pavement surface are minimized. The reduced chloride loading can be expected to yield beneficial secondary effects of lowered corrosion and reduced chloride levels in surface waters.

Efforts to minimize the corrosion of chloride de-icers have been ongoing for a number of years. Typical inhibitors such as amines, phosphate, zinc salts, borates, silicates and chromates are known and described. However, these attempts have led to limited success for a number of reasons, which include solubility problems of inhibitor, their toxicity and cost.

In recent years, attempts have been made to reduce the corrosive effects of chloride salt compositions, while maintaining the strong anti-freeze characteristics of these salts. U.S. Pat. No. 4,676,918 issued to Toth et al. discloses an anti-freeze composition comprising 20 to 90% by weight of a waste concentrate of the alcohol distilling industry in admixture with 10 to 80% by weight of water and optionally with additives. Similarly, U.S. Pat. No. 5,932,135 issued to Janke et al. discloses the use of at least 10% wine-making residue for use as a de-icing composition in combination with any of several chloride salts and at least 5% of water. Finally, U.S. Pat. No. 5,922,240 issued to Johnson et al. discloses the use of brewers' condensed solubles alone or in combination with at least one chloride salt. Further variations on the approach of adding organic waste to chloride salts include the ternary mixture of saccharinic acid, lignosulfonate and a chloride salt disclosed in U.S. Pat. No. 4,824,588 issued to Lin.

While each of the above compositions provides certain improvements in terms of reducing the corrosive effect of the chloride salts, they are still limited in that they draw from waste streams that produce only a fraction of the organic material needed for use with the huge amount of chloride salts which are applied in various anti-freeze applications. Since the organic materials proposed in the above disclosures are waste streams, their availability is subject to the demand for the primary product. Further, accessibility to alcohol distillates is limited in many of the northern regions where anti-freeze applications are most needed.

The States of Washington, Idaho, Montana and Oregon of the United States combined to establish a test for corrosion of chloride salts, and a specification for qualified pavement de-icing materials. The Pacific Northwest States (PNS) Coalition Chemical De-icer Specification limits the phosphorus and zinc content of de-icer materials. Hence, there is a need of an environmentally compatible, non-toxic, inhibitor effective for use with liquid de-icers.

SUMMARY OF THE INVENTION

The object of the current invention is to provide an environmentally friendly, agriculturally-derived material as a corrosion inhibitor for chemical de-icers which exhibits excellent corrosion inhibiting function. In combination with the inventive inhibitor or acting together with other inhibitor materials, the corrosion level of chloride salts can be reduced below the levels required by the PNS specification. This material is concentrated, de-sugared sugar molasses produced as a by-product of sugar beet or sugar cane processing.

DETAILED DESCRIPTION OF THE INVENTION

According to the invention the solid portion of the de-sugared molasses is primarily composed of sugars, other carbohydrates and proteins. The material also can have small amounts of zinc (15 mg/l) and phosphorus (190 mg/l). De-sugared sugar beet molasses is an aqueous solution further characterized as brown to dark brown colored; viscous liquid; having a sweet odor; very soluble in water; and an undiluted pH-value of 8.0 to 10.0, more preferred 9.0 to 9.5. The solid content of de-sugared molasses may be greater than 45 percent by volume, preferably 50 to 60 percent by volume. The crude protein content is greater than 9 percent, but generally not greater than 15 percent by weight. The sugar content is found to exceed 7 percent, but seldom greater than 20 percent by weight. Carbohydrate content is non-existent since all available carbohydrate material is used during the de-sugaring process.

The corrosion inhibitor of the invention can be used in water systems. It can, however, be particularly useful as a corrosion inhibitor in chloride-based de-icers or other de-icing materials sprayed on the roads to reduce the corrosion rate of metallic surfaces of motor vehicles, and structural roadway components such as bridges, signs and guardrails.

Examples of chloride-based de-icer solutions usable in the invention include calcium chloride, sodium chloride, potassium chloride or magnesium chloride.

Chloride de-icing solutions are conveniently administered in concentrations of from 15 to 35 percent solid chloride salt in water. Once applied to the roadway, the de-icing solution becomes diluted as it performs its function of liquefying the ice and/or snow on the roadway. Consequently, the concentration of chloride brine to which motor vehicles and roadway infrastructure are exposed to will vary depending on the dilution of the de-icing fluid. Estimates of reasonable dilution of the de-icing fluid on the roadway for purposes of corrosion evaluation can range from one to $\frac{1}{100}$ th percent by weight chloride salt concentration, or a dilution of a 32 percent calcium chloride solution from 30 to 300 to 3000 times.

The corrosion inhibitor of the invention may be used by addition of from 1 to 50 percent by volume of the de-sugared molasses, preferably 3 to 20 percent by volume, to a chloride-based de-icer solution based on the inhibitor having a solid content of 45 to 65 percent by volume.

The de-sugared sugar beet molasses material can be used by itself or can be mixed with other corrosion inhibitors that are effective in chloride-based liquid de-icers. There is no particular restriction on the kind of scale inhibitors or additives to be additionally employed. As examples of other corrosion inhibitors usable in combination with the present invention, there may be triethanol amine, Borax, benzotriazole, lignin sulfonate or sodium glucoheptonate.

An additional benefit of the present invention resides in the property of de-sugared sugar beet molasses to improve the solubility of other inhibitors that have low or semi-soluble properties in chloride brine. In this instance, the de-sugared sugar beet molasses acts both as an inhibitor and as a "carrying agent" for the low solubility inhibitor.

Suitable sources of de-sugared beet molasses may be secured from refiners. The invention is not limited to de-sugared sugar molasses from any single source. De-sugared molasses including molasses originating from cane sugar will also give equivalent corrosion inhibitor performance.

Advantages described above, and other further advantages are apparent from the following examples:

EXAMPLES 1–9

Examples 1 to 9 each consist of some samples/batches which were made at the same time. Aqueous calcium chloride solution is the de-icer solution.

All corrosion tests, including sample make-up, coupon selection and processing, were done according to the Pacific Northwest States (PNS) Coalition Chemical De-icer Specification (available from Washington, Oregon, Idaho or Montana Department of Transportation) according to the following description.

Preparation of the Coupons

The coupons used are ½" (approximately 1.38 in.×0.56 in.×0.11 in.) flat steel washers displaying a density of approximately 7.85 grams per cubic centimeter. Coupons meet ASTM F 436, Type 1, with a Rockwell Hardness of C 38-45. Each coupon used in the test procedure is subjected to the following process to assure accuracy in test results.

Coupons are wiped with suitable solvent, such as toluene to remove grease and oil.

Each coupon was examined for metallurgical abnormalities. Coupons having visible flaws are rejected.

Acceptable coupons are stamped for identification.

Coupons are acid etche d with a 18.5 per cent solution of HCl for approximately 2–3 minutes.

The coupon s are then quickly rinsed with tap water, distilled water, wiped dry and placed in chloroform.

When the coupons are removed from the chloroform for use, they are place on a paper-lined tray (not touching each other) and allowed to air dry in a ventilated hood for a minimum of 15 minutes.

Coupons are measured as specified. Coupons are handled wearing latex gloves.

Each coupon is weighed to a constant weight comprising two consecutive weighings of each coupon within a minimum of 0.5 milligrams of each other. Incidental flash rusting prior to weighing, if any, is not removed.

The values recorded reflect the average of three coupons in each de-icer solution and for the distilled water and Sodium Chloride control standards.

Measuring of Compounds

The outside diameter, inside diameter, and the thickness of each coupon is measured twice at 90 degrees from each initial reading and the averages calculated for each measurement. The averages are then used to calculate the surface area of each coupon with the following formula:

$A=(3.1416/2)(D2-d2)+3.1416(t)(D)+3.1416(t)(d)$

Where D=average outside diameter
d=average inside diameter
t=average thickness

Preparation of the Solutions and the Corrosion Test

ASTM D 1193 Type II distilled water is used to prepare each solution, blank, and control standard. The Sodium Chloride (NaCl) used to prepare the salt standard shall be of "ANALYZED REAGENT GRADE" quality.

A 3 percent solution of NaCl is prepared by weight, using the reagent grade salt and distilled water.

A 3 percent solution of each de-icer to be tested is prepared using distilled water to dissolve and or dilute the de-icer. For liquid de-icer products, three parts liquid de-icer product (as received) is mixed with 97 parts distilled water to produce the test solution. If the de-icer product is a dry product, then the 3 percent solution is made by weight.

All solutions including the distilled water blank are allowed to sit while covered for a minimum of 12 hours to stabilize, equilibrate, ensure solubility and account for any reactivity that might have occurred.

Approximately 300 milliliters (actual volume is determined by the surface area of test coupons) of each solution was mixed with distilled water and is put into a 500 milliliter Erlenmeyer flask. Each flask is equipped with a rubber stopper that had been drilled to allow a line to run through it. The line is attached to a plastic frame made to hold coupons inside the flask where three coupons are attached to each plastic frame. The plastic frame is lowered into the de-icing solution for 10 minutes then raised out of the solution but within the flask for 50 minutes. In this way the coupons are exposed to the test solution 10 minutes of each hour. The corrosion test is then run for 72 hours. No agitation of the solution is made during the corrosion test.

Corrosion tests are conducted at ambient room temperature.

The coupons are removed from the solution after 72 hours. In a ventilated hood they are placed into glass beakers containing the cleaning acid, concentrated (37 percent) hydrochloric acid (HCl) containing 50 grams/liter SnCl2 (stannous chloride) and 20 grams/liter SbCl3 (antimony trichloride).

After 15 minutes of cleaning the coupons are removed from the cleaning acid, rinsed with tap water and then distilled water, and wiped with a cloth to clean any deposit from the coupons. They are then returned to the cleaning acid and the procedure is repeated. After cleaning the coupons are rinsed in chloroform, air dried, and weighed.

Each coupon is weighed to a constant weight.

Evaluation of Corrosion

The weight loss of each coupon is determined by subtracting the final weight from the original weight. The corrosion rate for each coupon is expressed as mils penetration per year (MPY) by the following formula:

MPY=(weight loss (milligrams))(534)/((area)(time)(metal density))

or

MPY=(weight loss (milligrams))(534) divided by ((area) (time-)(metal density))(Density for taken as 7.85 g/cc steel)

The final MPY value for each solution is determined by calculating an average of the three individual coupons. Average MPY from this point forward will be referred to as only MPY of the solution being tested.

Reporting Results

Results are reported in Percent Effectiveness using the weight lost distilled water samples as 0 percent and the NaCl solution as 100 percent.

The data in Table 1 to 3 represents the values of corrosion rates that would occur in percent effectiveness using the PNS method. Table 1 (Examples 1 to 5) shows the test results of various batches only using HSC as an inhibitor, Table 2 (Examples 6 and 7) results with HSC and other additives/inhibitors and Table 3 (Examples 8 and 9) corrosion inhibition properties of other sugar-based products. The values reflect the average weight losses and absolute corrosion in mils per year of 3 coupons per test cell.

All samples were prepared on a percent by volume basis, except those in Example 1 which are on a weight percent basis of the active amount of calcium chloride in solution.

For Examples 2 to 9, a de-sugared beet molasses inhibitor solution having a solid content of approximately 50 percent by volume was used. The de-sugared beet molasses was identified as Holly Separator Concentrate (HSC) obtained from Imperial Holly Sugar (address: Holly Sugar Corporation, P.O. Box 1052, Colorado Springs, Co. 80901 sourced from a Hereford, Tex., facility of Holly Sugar). The percent specifications of the examples refer to the solid content.

TABLE 1

Test With Only Using HSC as an Inhibitor

| Example No. | Material Tested | Corrosion Rate |
|---|---|---|
| 1 | 1.20% calcium chloride | 67.14% |
|   | 1.20% calcium chloride w/0.012% HSC | 70.12% |
|   | 1.20% calcium chloride w/0.036% HSC | 63.41% |
|   | 1.20% calcium chloride w/0.06% HSC | 53.02% |
| 2 | 1.25% calcium chloride | 70.08% |
|   | 1.24% calcium chloride w/0.056% HSC | 44.51% |
|   | 1.22% calcium chloride w/0.093% HSC | 32.03% |
|   | 1.20% calcium chloride w/0.13% HSC | 26.99% |
| 3 | 1.25% calcium chloride | 69.46% |
|   | 1.22% calcium chloride w/0.093% HSC | 34.96% |
|   | 1.20% calcium chloride w/0.13% HSC | 27.99% |
| 4 | 1.25% calcium chloride | 70.5% |
|   | 1.20% calcium chloride and 0.13% HSC | 28.1% |
|   | 1.16% calcium chloride and 0.185% HSC | 27.9% |
|   | 1.10% calcium chloride and 0.28% HSC | 23.2% |
|   | 1.03% calcium chloride and 0.37% HSC | 21.5% |
|   | 0.65% calcium chloride and 0.94% HSC | 14.7% |
|   | 0.92% calcium chloride and 0.93% HSC | 15.3% |
|   | 1.87% HSC | 15.5% |
| 5 | 1.25% calcium chloride | 68.2% |
|   | 1.20% calcium chloride w/0.13% HSC | 27.5% |

*1,3 & 5% by weight of active calcium chloride are approximately <1% by volume

TABLE 2

Test with HSC as and Other Additives/Inhibitors

| Example No. | Material Tested | Corrosion Rate |
|---|---|---|
| 6 | 1.25% calcium chloride | 68.7% |
|   | 1.24% calcium chloride, 0.019% HSC and 0.47% PCI* | 28.6% |
|   | 1.24% calcium chloride, 0.038% HSC and 0.47% PCI | 24.4% |
|   | 1.24% calcium chloride, 0.056% HSC and 0.47% PCI | 25.1% |
|   | 1.24% calcium chloride and 0.47% PCI | 29.9% |
|   | 1.24% calcium chloride, 0.019% HSC and 0.29% PCI | 29.8% |
|   | 1.24% calcium chloride, 0.038% HSC and 0.29% PCI | 29.0% |
|   | 1.24% calcium chloride, 0.056% HSC and 0.29% PCI | 28.0% |
|   | 1.24% calcium chloride and 0.29% PCI | 40.8% |
| 7 | 1.25% calcium chloride | 68.2% |
|   | 1.20% calcium chloride, 0.13% HSC | 27.5% |
|   | 1.20% calcium chloride, 0.13% HSC and 0.012% triethanol amine | 29.3% |
|   | 1.20% calcium chloride, 0.13% HSC and 0.012% Mayoquest L-50 | 32.1% |
|   | 1.20% calcium chloride, 0.13% HSC and 0.012% Borax 5M | 32.3% |
|   | **1.20% calcium chloride, 0.13% HSC and 0.003% benzotriazole | 24.7% |
|   | ***1.20% calcium chloride w/0.13% HSC and 0.1% PCI | 26.9% |
|   | ***1.20% calcium chloride w/0.13% HSC and 0.19% PCI | 27.3% |
|   | ***1.20% calcium chloride w/0.13% HSC and 0.29% PCI | 21.7% |

*PCI—Polymeric Corrosion Inhibitor, Georgia Pacific
***Examples of using HSC to help solublize a lower solubility materials. PCI tends to precipitate from solution. Precipitation reduced when mixed with HSC.

TABLE 3

Corrosion Inhibition Properties of Other Sugar-base Products

| Example No. | Material Tested | Corrosion Rate |
|---|---|---|
| 8 | 1.20% calcium chloride* | — |
|   | 1.20% calcium chloride w/0.056% molasses | 62.2% |
|   | 1.20% calcium chloride w/0.093% molasses | 52.4% |
|   | 1.20% calcium chloride w/0.130% molasses | 47.4% |
| 9 | 1.20% calcium chloride | 62.7% |
|   | 1.20% calcium chloride w/0.012% white sugar | 67.0% |
|   | 1.20% calcium chloride w/0.036% white sugar | 66.5% |
|   | 1.20% calcium chloride w/0.060% white sugar | 60.7% |
|   | 1.20% calcium chloride w/0.012% brown sugar | 66.4% |
|   | 1.20% calcium chloride w/0.036% brown sugar | 62.2% |
|   | 1.20% calcium chloride w/0.060% brown sugar | 54.8% |

*Not run. Typical values of 65–70%

These Examples show that in water solutions, concentrations of from five to twenty-five percent by weight compared to the weight of chloride salt, of de-sugared beet molasses is an effective corrosion inhibitor.

What is claimed is:

1. A corrosion inhibitor for chloride-based de-icers comprising a desugared sugar molasses having a pH from 8.0 to 10.0, a solid content of 45 to 65 percent by volume, a crude protein content greater than 9 percent by weight and a sugar content greater than 7 percent by weight.

2. A corrosion inhibited de-icing solution comprising from 1 to 50 percent by volume of the corrosion inhibitor of claim 1 and from 99 to 50 percent by volume of a chloride-based de-icer.

3. The corrosion inhibited de-icing solution of claim 2 having a crude protein content from 3 to 9 percent by weight.

4. The corrosion inhibited de-icing solution of claim 2 wherein the chloride de-icer is selected from the group consisting of chloride salts of calcium, sodium, potassium, magnesium, and mixtures thereof.

5. The corrosion inhibited de-icing solution of claim 4 having a crude protein content from 3 to 9 percent by weight.

6. The corrosion inhibited de-icing solution of claim 3 having a pH of from 7.5 to 9.5.

* * * * *